(12) United States Patent
Ikeda

(10) Patent No.: US 6,976,645 B2
(45) Date of Patent: Dec. 20, 2005

(54) EJECTOR FOR USE WITH PNEUMATIC BOOSTER

(75) Inventor: Junichi Ikeda, Tokyo (JP)

(73) Assignee: Kabushiki Kaisha Hitachi Seisakusho, Tokyo (JP)

( * ) Notice: Subject to any disclaimer, the term of this patent is extended or adjusted under 35 U.S.C. 154(b) by 160 days.

(21) Appl. No.: 10/629,584

(22) Filed: Jul. 30, 2003

(65) Prior Publication Data

US 2005/0077373 A1    Apr. 14, 2005

(51) Int. Cl.[7] ............................................... B05B 1/14
(52) U.S. Cl. ............... 239/590; 239/590.5; 239/590.3; 239/553.3; 239/428.5; 417/196
(58) Field of Search ..................... 417/196; 239/428.5, 239/590.5, 590.3, 553.3, 590

(56) References Cited

U.S. PATENT DOCUMENTS 3,754,841 A * 8/1973 Grabb et al. ................ 417/189
5,796,772 A * 8/1998 Smith et al. ................ 417/196
6,625,981 B2 * 9/2003 Ikeda et al. .................. 60/397

FOREIGN PATENT DOCUMENTS

| JP | 2002-211385 | 7/2002 |
| JP | 2003-21100 | 1/2003 |

* cited by examiner

Primary Examiner—David A. Scherbel
Assistant Examiner—James S. Hogan
(74) Attorney, Agent, or Firm—Wenderoth, Lind & Ponack, L.L.P.

(57) ABSTRACT

An ejector having an ejector body integrally formed with a nozzle having inlet and outlet ends, a diffuser having inlet and outlet ends and a suction passage defining a suction port between the outlet end of the nozzle and the inlet end of the diffuser. The nozzle and diffuser define fluid passages having a rectangular cross section or a circular cross section in which the narrowest portion of the fluid passage of the nozzle defines a throat. The diffuser has a diverging portion which diverges to have a divergence angle of 5–10 degrees in case of a two dimensional ejector or 3.5–6.5 degrees in case of a three dimensional ejector.

17 Claims, 8 Drawing Sheets

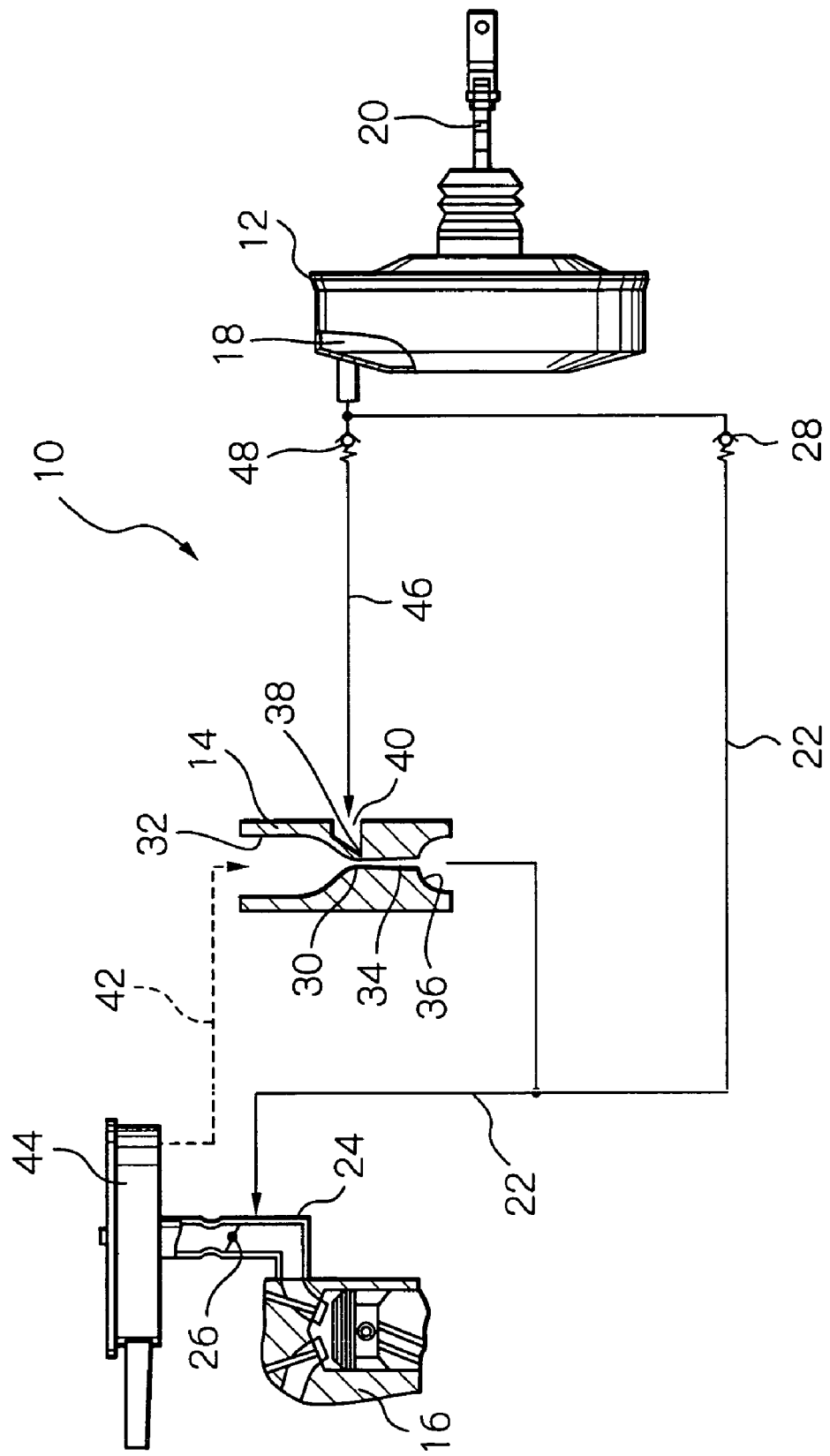

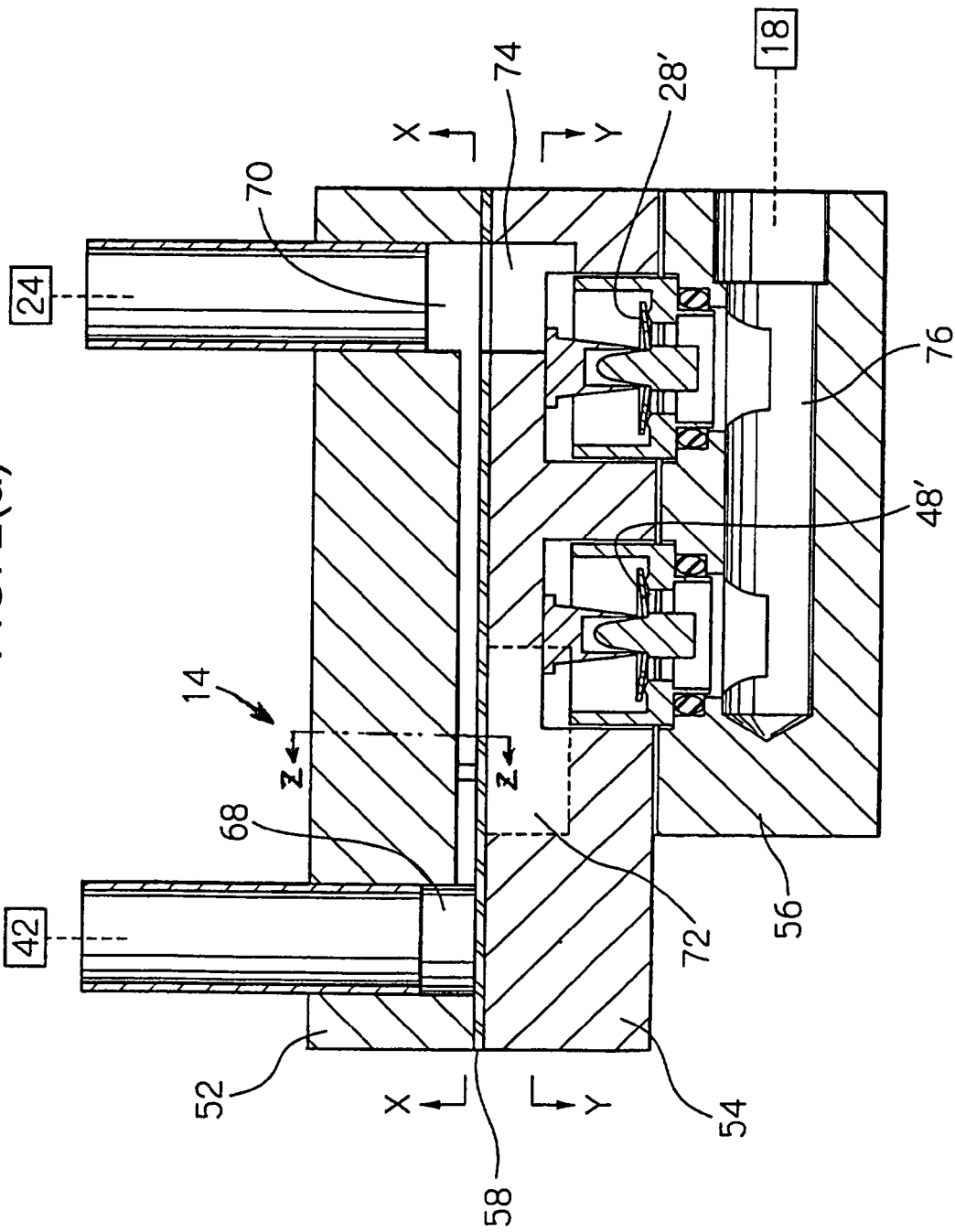

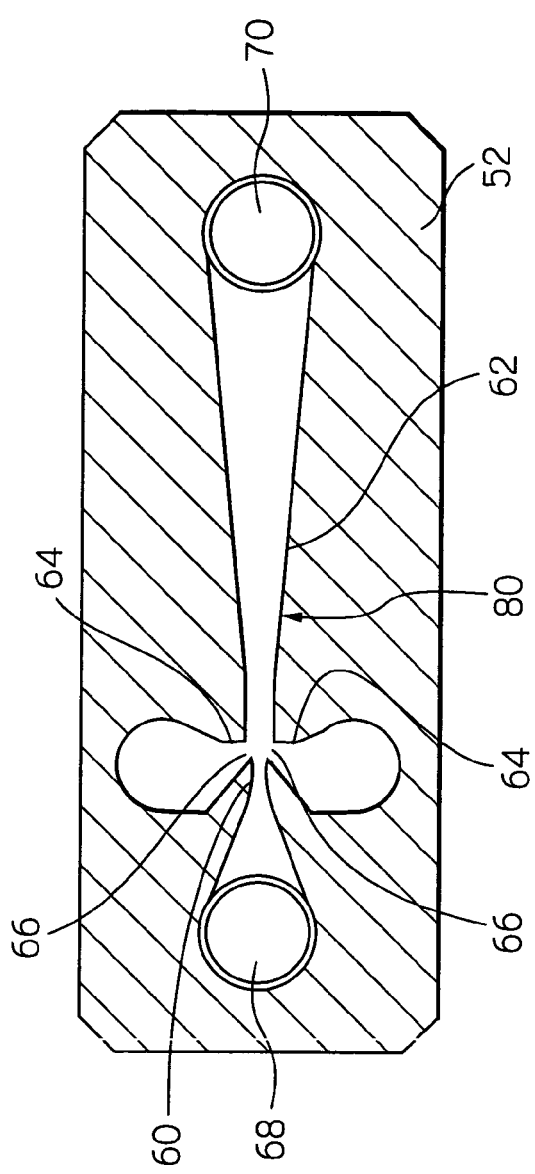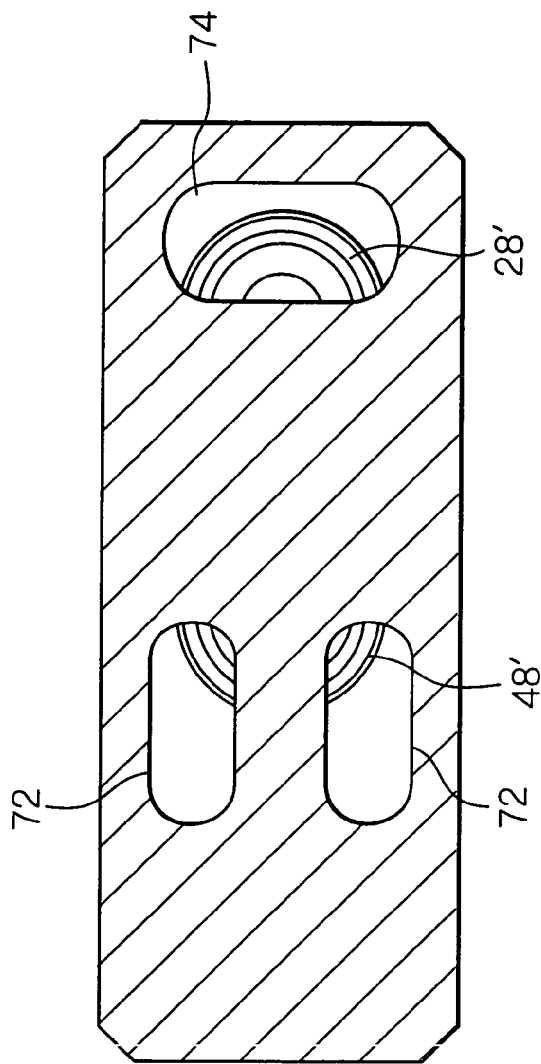

EJECTOR FOR USE WITH PNEUMATIC BOOSTER

BACKGROUND OF THE INVENTION

The present invention relates to an ejector which is used with a pneumatic booster for a brake apparatus so that it enhances the magnitude of vacuum established in a vacuum chamber of the booster.

Generally, in a brake apparatus for an automobile, a pneumatic booster is provided so as to increase a braking force. In this pneumatic booster, an intake vacuum of an engine is introduced into a vacuum chamber of the booster, and, due to a differential pressure relative to atmospheric pressure, a thrust force is generated in a power piston provided in the booster, thus increasing a force for operating the brake apparatus.

Usually an engine provides an intake vacuum which is sufficiently high for this purpose. For example, an engine provides an intake vacuum in a range of −300∼−400 mmHg even in its idling condition. However, the intake vacuum may drop to an undesirable level, say to a range of −100∼−200 mm Hg, in some occasions. For example, when a load on the engine is increased by actuating an auxiliary appliance which utilizes the power from the engine, such as an air conditioner and a power steering motor, a throttle is opened wider in order to increase the engine power with the rate of rotation of the engine being unchanged. The throttle thus decreases the differential pressure across it, thereby lowering the intake vacuum. This tendency is especially eminent in case of small automobiles.

Furthermore, during the time immediately after a cold start of an engine, a sufficiently high negative pressure cannot be obtained either. In these cases, decreased vacuum in the vacuum chamber lowers a servo power provided by the power piston of the booster.

Therefore, proposals have been made to employ a pneumatic booster utilizing an ejector, so as to increase a negative pressure introduced into the vacuum chamber.

Although the use of ejectors for enhancing vacuum in a vacuum chamber of a pneumatic booster is known, it has been always desired to make an ejector more efficient so that it can provide a desired high vacuum even from a lower operation vacuum created by an engine. In other words, it has been desired to improve an ejector so that a range of low operational vacuum pressures which has not been useful to establish a desired high vacuum in the vacuum chamber of a booster becomes usable.

Furthermore, it has always been desired to improve an ejector so that it provides a greater flow rate in evacuating the vacuum chamber so that the desired high vacuum can be resumed in the vacuum chamber in a short time. This is very important because, when a brake is once used, it must prepare for the next use in a very short time by establishing the desired high vacuum in the vacuum chamber.

SUMMARY OF THE INVENTION

In view of the above, the present invention has been made. It is an object of the present invention to provide an ejector which exhibits a superior performance when used with a pneumatic booster, with an intake system of an engine being used as a source of an operation vacuum.

In order to achieve the above-mentioned object, the present invention provides an ejector having an ejector body which integrally includes therein a nozzle having inlet and outlet ends, a diffuser having inlet and outlet ends and a suction passage defining a suction port between the outlet end of the nozzle and the inlet end of the diffuser. The nozzle and diffuser define fluid passages of a rectangular cross section having a constant height in which the narrowest portion of the fluid passage of the nozzle defines a throat. The invention is characterized in that opposing side walls of the fluid passage of the diffuser have diverging portions each of which resides in a zone of angle of 2.5–5 degrees with respect to a line drawn in parallel with the centerline of the diffuser from the point of the associated one of opposing side walls of the fluid passage of the nozzle at the throat.

In case where the nozzle and the diffuser define fluid passages of a circular cross section, the diverging portion of the diffuser diverges in such a way that a generator resides in a zone of angle of 1.75–3.25 degrees with respect to a line drawn in parallel with the centerline of the diffuser from the point on the wall of the fluid passage of the nozzle at the throat.

An embodiment of the invention will now be described in more detail with reference to the accompanying drawings.

BRIEF DESCRIPTION OF THE DRAWINGS

FIG. 1 is a schematic illustration showing a general arrangement of a boosting system for a brake of an automobile in which an ejector according to the present invention is incorporated.

FIG. 2(*b*) is a sectional view taken alone line Z—Z of FIG. 2(*a*) to show a fluid passage having a rectangular shaped cross section.

FIG. 2(*c*) is a sectional view taken alone line Z—Z of FIG. 2(*a*) to show a fluid passage having a circular shaped cross section.

FIG. 3 is a sectional view taken along the line X—X in FIG. 2.

FIG. 4 is a sectional view taken along the line Y—Y in FIG. 2.

DETAILED DESCRIPTION OF THE INVENTION

Figure 2B:
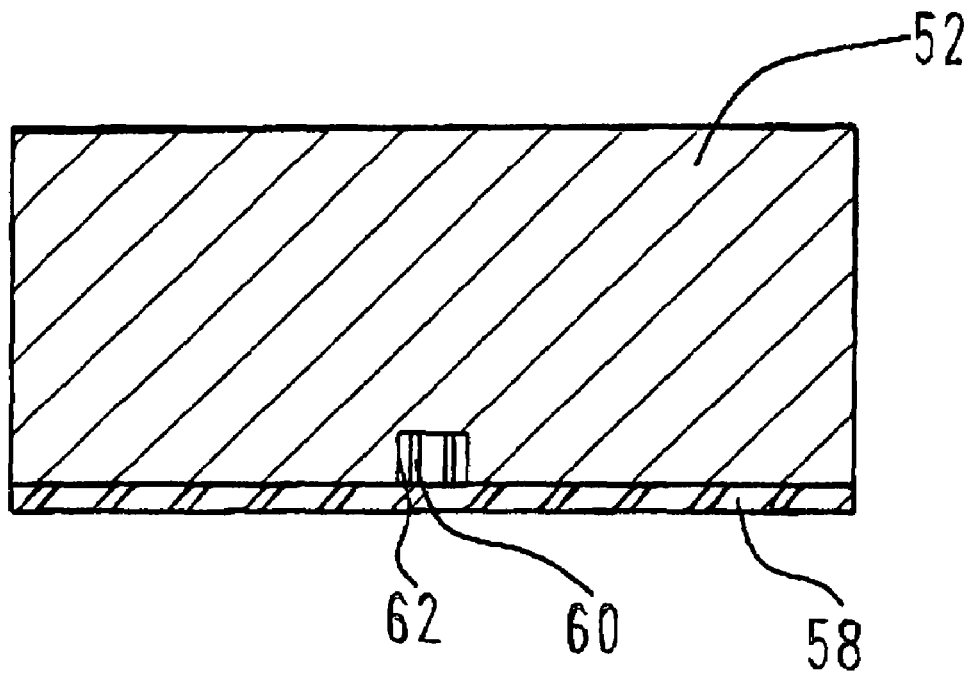
FIG. 2(*a*) is a sectional view of the ejector according to the invention.

FIG. 1 shows a system for establishing a desired vacuum in a vacuum chamber of a pneumatic booster in which an ejector according to the invention is incorporated. As shown in FIG. 1, a pneumatic booster 10 comprises a booster body 12 and an ejector 14. A suction system of an engine 16 is used as a source of negative pressure or an operation vacuum.

The booster body 12 comprises a vacuum chamber 18 and a variable pressure chamber separated by a power piston. In accordance with an input force (a brake operating force) applied to an input rod 20 connected to a brake pedal, air is introduced into the variable pressure chamber. Due to a differential pressure generated between the vacuum chamber and the variable pressure chamber, a thrust force is generated in the power piston and a servo power is imparted to the brake operating force. The vacuum chamber 18 of the booster body 12 is connected through a pipe 22 to a portion of an intake pipe 24 of the engine 16 downstream of a throttle valve 26. A check valve 28 is provided in the pipe 22 so as to prevent a flow of air from the intake pipe 24 to the vacuum chamber 18.

The ejector 14 comprises a nozzle 30 provided to communicate with an air inlet 32 of the ejector and a diffuser 34 provided to communicate with an air outlet 36 of the ejector. Suction ports 38 are formed between the nozzle 30 and the diffuser 34, and a vacuum pick-up port 40 of the ejector is communicated with the suction ports 38. By effecting a flow of air from the nozzle 30 to the diffuser 34, a negative pressure is generated in the suction ports 38 and air is sucked in through the vacuum pick-up port 40 due to the effect of this negative pressure.

The air inlet 32 of the ejector 14 is connected through a pipe 42 to an air cleaner 44 attached to an upstream-side portion of the intake pipe 24, and is open to the atmosphere. The air outlet 36 is connected to a portion of the intake pipe 24 downstream of the throttle valve 26. Further, the vacuum pick-up port 40 is connected through a pipe 46 to the vacuum chamber 18 of the booster body 12. A check valve 48 is provided in the pipe 46 so as to prevent a flow of air from the vacuum pick-up port 40 to the vacuum chamber 18 of the booster body 12.

In the foregoing arrangement, the ejector 14 operates as follows.

The negative pressure in the intake pipe 24 of the engine 16 is usually introduced through the pipe 22 to the vacuum chamber 18 of the booster body 12. In such a condition where the negative pressure in the vacuum chamber 18 of the booster body 12 is low, for example, immediately after start-up of the engine 16, a higher vacuum is created in the suction ports of the ejector 14 and such a higher vacuum is utilized. Due to the effect of the negative pressure in the intake pipe 24 of the engine 16, a flow of air is effected from the air inlet 32 to the air outlet 36 of the ejector 14 through the pipes 42 and 22, to thereby generate a negative pressure at the suction ports 38. This negative pressure is introduced from the vacuum pick-up port 40 through the pipe 46 into the vacuum chamber 18 of the booster body 12. In this instance, since a higher negative pressure is generated at the vacuum pick-up port 40 by the ejector 14, it is possible to supply sufficient negative pressure to the booster body 12 even when the negative pressure in the intake pipe 24 is low immediately after start-up of the engine 16, thus avoiding the problem of generating an insufficient servo power.

Particular structural features of the ejector 14 will now be described with reference to FIGS. 2–10. In the embodiment, the ejector is formed as a unitary body incorporating therein check valves which correspond to those designated by reference numerals 28 and 48 in FIG. 1.

Figure 2C:
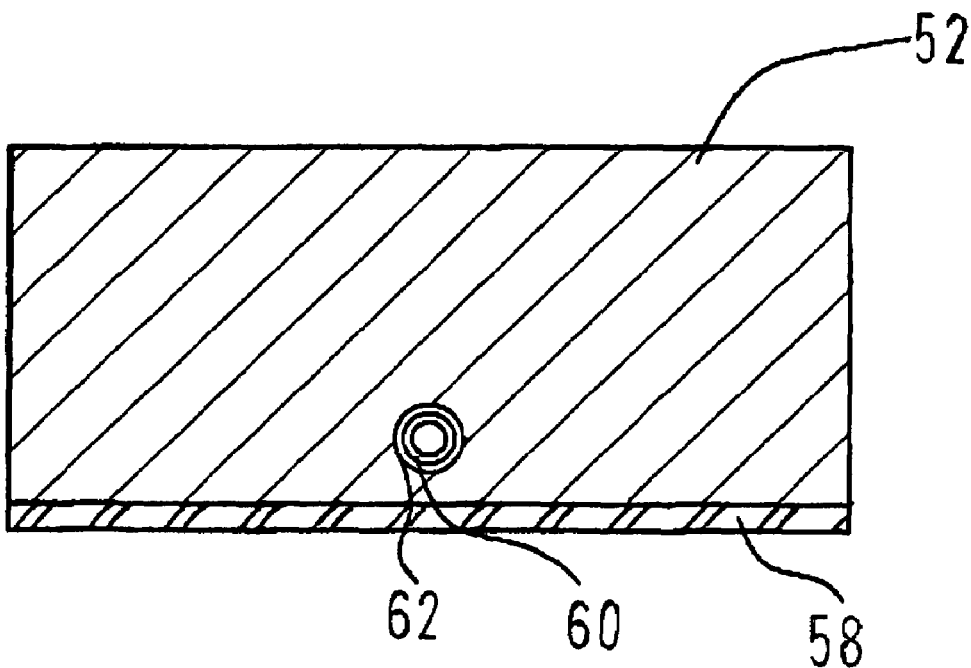

As shown in FIG. 2, the ejector 14 comprises an ejector body 52, a back plate 54 and a bottom cover 56 which are connected together into a unitary body with a seal plate 58 being provided between the ejector body 52 and the back plate 54.

A flat connecting surface of the ejector body 52 for connection with the back plate 54 includes a recess 80, which forms a nozzle 60, a diffuser 62 and a pair of suction passages 64. The suction passages 64 are formed to communicate with the combination of the nozzle 60 and the diffuser 62 so that suction ports 66 are formed between the nozzle 60 and the diffuser 62.

Each of the nozzle 60, the diffuser 62 and the suction passages 64 has a flat bottom surface. In the illustrated embodiment, they have a common flat bottom surface. Each of the nozzle 60, the diffuser 62 and the suction passages 64 has vertical side walls extending normally from the connecting surface of the ejector body 52 so that they have rectangular cross sections (see FIG. 2(b)).

The inlet end of the nozzle 60 is communicated with an inlet bore 68 which in turn is connected to the pipe 42 shown in FIG. 1 through the inlet 32 of the ejector and the outlet end of the diffuser 62 is communicated to an intake bore 70 which in turn is connected to the intake pipe 24 shown in FIG. 1 through the outlet 36 of the ejector. The ejector body 52 provided with these portions can be formed as an integral body by injection molding of a synthetic resin.

A connecting surface of the back plate 54 for connection with the ejector body 52 includes recesses 72 and 74. The bottom cover 56 has an evacuation passage 76 which is to be connected to the vacuum chamber 18 of the booster body 12. Check valves 28' and 48' are provided between the back plate 54 and the bottom cover 56. They achieve the same function as the check valves 28 and 48. The recesses 72 communicate the suction passages 64 with the check valve 48' through openings formed in the seal plate 58 and the recess 74 communicates the intake bore 70 with the check valve 28' through an opening formed in the seal pate 58.

When the intake vacuum of the engine (operation vacuum) is sufficiently higher than the vacuum in the vacuum chamber 18, the intake vacuum is directly introduced into the vacuum chamber 18 through the check valve 28'. When the intake vacuum of the engine is insufficient relative to the vacuum in the vacuum chamber 18, air which is introduced from the inlet bore 68 toward the intake bore 70 of the ejector 14 generates a higher negative pressure at the suction ports 66, and this negative pressure is introduced into the vacuum chamber 18 through the suction passages 64, the recesses 72 and the check valve 48'. Thus, even when the intake vacuum of the engine is low, a high negative pressure can be generated by the ejector 14 and introduced into the vacuum chamber 18, utilizing the intake vacuum of the engine as an operation vacuum of the ejector.

The inventor has assured, by performing experiments, that the efficiency of an ejector of the type as noted above is influenced to a certain degree by particular shapes of the nozzle and the diffuser. It will now be explained how parameters regarding the shapes of them influence the efficiency of the ejector.

Figure 5:
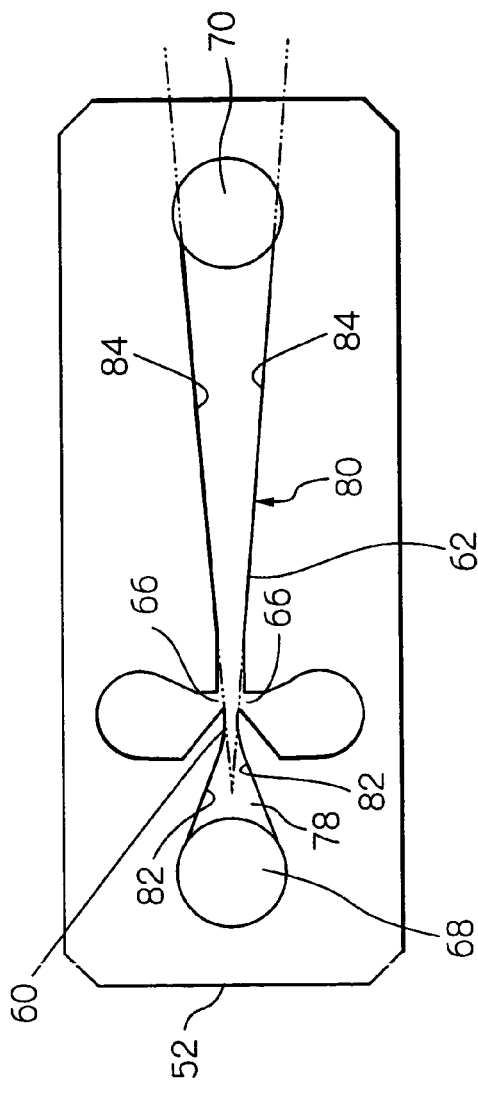
FIG. 5 is a schematic view of the components of the ejector shown in FIG. 3.

FIG. 5 is a schematic illustration of the combination of the nozzle 60 and the diffuser 62. Such fluid passage structure including a fluid passage defined by the nozzle and a fluid passage defined by the diffuser is sometimes referred to as "Laval nozzle" which has, by definition, a converging flow path and a diverging flow path with a throat formed therebetween. The nozzle 60 is defined by the flat bottom surface 78 of the recess 80 formed in the ejector body 52 and opposing side walls 82, as well as an associated flat surface of the seal plate 58 fixed to the ejector body 52. The flat bottom surface extends parallel to the connecting surface of the ejector body 52. Furthermore, the side walls extend normally to the connecting surface of the ejector body 52. Therefore, the nozzle 60 has a rectangular cross section.

Likewise, the diffuser 62 is defined by the common flat bottom surface 78 of the recess 80 and opposing side walls 84, as well as the associated flat surface the seal plate 58. The side walls 84 extend normally to the connecting surface of the ejector body 52. Therefore, the diffuser 62 also has a rectangular cross section.

Figure 6:
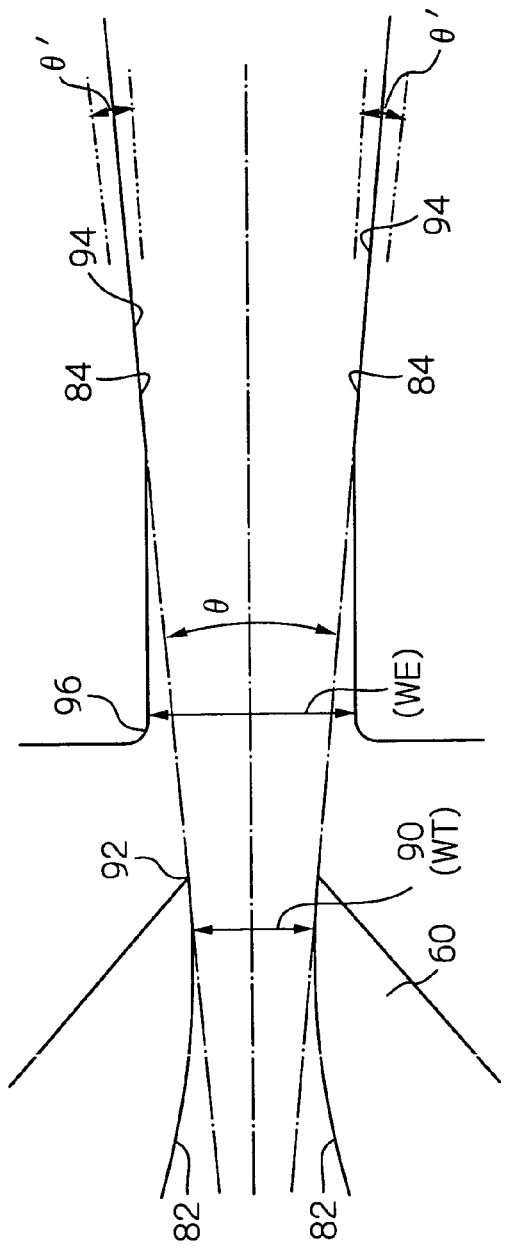
FIG. 6 is an enlarged view of an area around the suction ports in FIG. 5.

With reference to FIG. 6 which shows a portion of FIG. 5 around the suction ports 66 in an enlarged scale, the side walls 82 of the nozzle 60 are defined by portions of circles. A throat 90 is formed at a point where the side walls 82 have the least distance between them. This distance, namely, the width of the throat is designated by (WT). The outlet end 92 of the nozzle 60 is spaced apart from the throat 90. As to the distance between the throat 90 and the outlet end 92, an explanation will be made later.

It is desired that the throat has an elongated rectangular cross section having a major axis in its depth or height direction and a minor axis in its widthwise direction. This is because that since an air flow gradually increases its width only as it passes through the diffuser, it will have a square cross section, which provides most desired flow configuration in view of minimizing a loss caused by friction, at a middle portion of the diffuser. Otherwise, the air flow will become too much flattened as it flows through the diffuser. It is also desired that the ratio between the dimensions of the major and minor axes is within a range of 2–4. If the width of the throat is too narrow, it creates a considerable friction which impedes establishment of a sufficient vacuum.

It is also desired that the cross sectional area of the throat takes a value within a certain range. This is because that if it is too small, it cannot provide sufficient air discharge for attaining a desired high vacuum. On the other hand, if the area is too large, an increased flow rate affects the intake system of the engine. Thus, it is desired that the cross sectional area of the throat is within a range of 1.5–4.0 mm$^2$.

The side walls 84 of the diffuser 62 have diverging portions 94. Each of the diverging portions extends on a straight line passing through the point of the associated side wall 82 of the nozzle 60 at the throat 90. In the illustrated embodiment, the diverging portions 94 are symmetrically arranged with respect to the centerline of the diffuser. The angle defined between the diverging portions 94 will be referred to as "divergence angle" ($\theta$).

Some extent of the side walls 84 of the diffuser 62 on the side of the inlet end 96 are made parallel. The distance between these parallel wall portions define the width (WE) of the diffuser inlet end 96.

FIGS. 7–10 show influence of some parameters to the magnitude of an attained vacuum or to the flow rate of the fluid sucked by the ejector.

Figure 7:
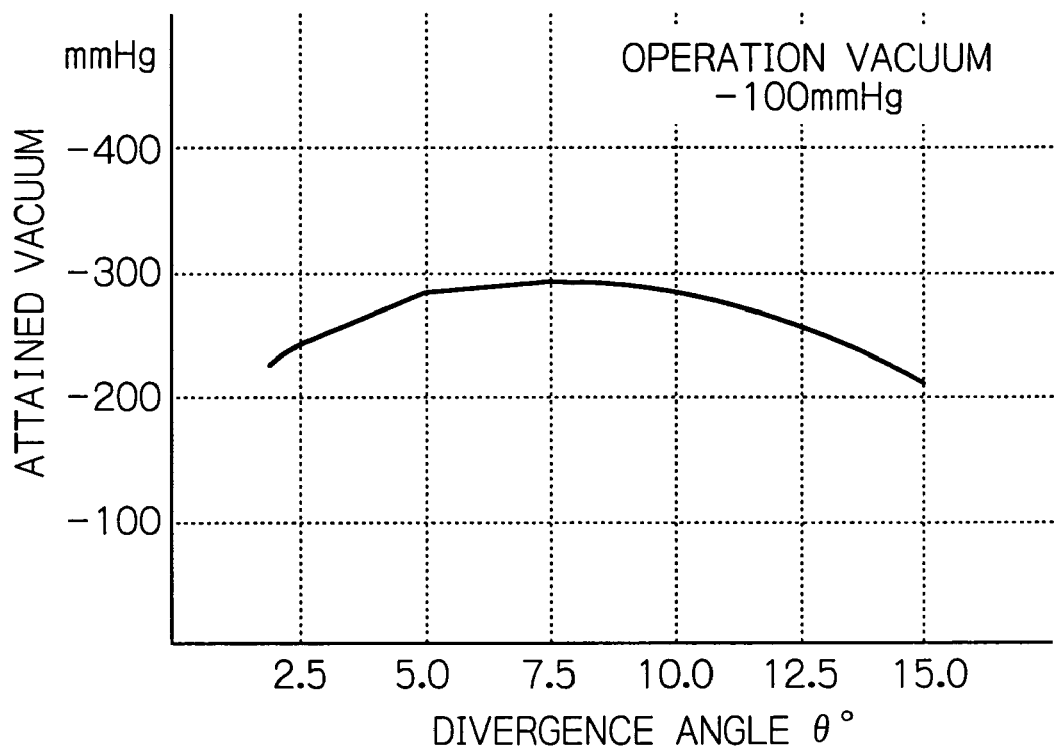
FIG. 7 is a graph showing a relationship between an attained vacuum and a divergence angle in case of a two-dimensional ejector.

FIG. 7 shows a test result in which the vacuum at the suction ports was measured as the divergence angle $\theta$ is changed. The operation vacuum applied to the intake bore 70 was −100 mm Hg. This value of −100 mm Hg represents the lowest vacuum encountered during running of engines of small automobiles. Thus, it is assumed that if an ejector shows an advantageous effect with this low operation vacuum, the ejector will also be useful for other larger automobiles which usually establish a higher operation vacuum.

As shown in FIG. 7, highest vacuum was attained in the range of the divergence angle $\theta$ between 5.0–10.0 degrees, with the best result being attained when the divergence angle is 7.5 degrees. When the divergence angle $\theta$ was less than 5.0 degrees, increased friction between the side walls and air impeded enhancement of the attained vacuum. On the other hand, when the divergence angle $\theta$ was more than 10.0 degrees, detachment of the flow from the diffuser walls took place, creating eddies. This phenomenon also increased friction and impeded enhancement of the attained vacuum.

Judging from the foregoing test result and considering the phenomena into account, the inventor has determined that it will not be absolutely necessary for each diverging portion to be strictly linear and that a comparable advantage will be attained if each diverging portion resides in a zone of angle $\theta'$ which makes 2.5–5 degrees with respect to an imaginary line drawn in parallel with the centerline of the diffuser from the point of the associated side wall of the nozzle 60 at the throat 90. It will be appreciated that such an imaginary line is, in this embodiment, tangential to the side wall at the throat 90.

In the downstream of the outlet of the diffuser, the walls may take any configuration unless the cross sectional area of the fluid passage is decreased, although in the illustrated embodiment, the outlet end of the diffuser directly connects with the intake bore 70.

Figure 8:
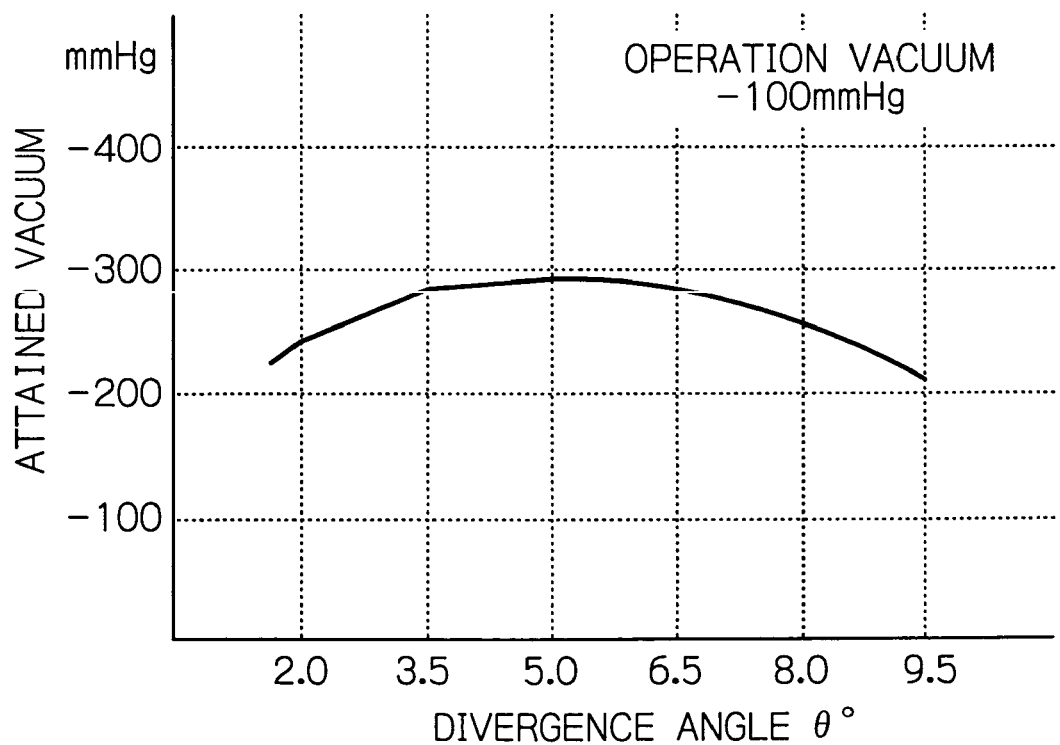
FIG. 8 is a graph showing a relationship between an attained vacuum and a divergence angle in case of a three-dimensional ejector.

Although, the illustrated ejector 14 has the nozzle and the diffuser having a rectangular cross section and, therefore, the ejector may be called a two-dimensional ejector, the spirit of the invention can also be applied to an ejector (three dimensional ejector) having nozzle and diffuser of a circular cross section. FIG. 8 shows a test result which shows a relationship corresponding to that in FIG. 7, but for a three-dimensional ejector. As shown in FIG. 8, highest vacuum is attained in the range of the divergence angle $\theta$ between 3.5–6.5 degrees, with the best result being attained when the divergence angle is 5.0 degrees. As is the case of the test result of FIG. 7, a comparable advantage will be attained if a generator of the conical diverging portion resides in a zone of angle $\theta'$ which makes 1.75–3.25 degrees with respect to an imaginary line drawn in parallel with the centerline of the diffuser from the point of the side wall of the nozzle 60 at the throat 90.

Figure 9:
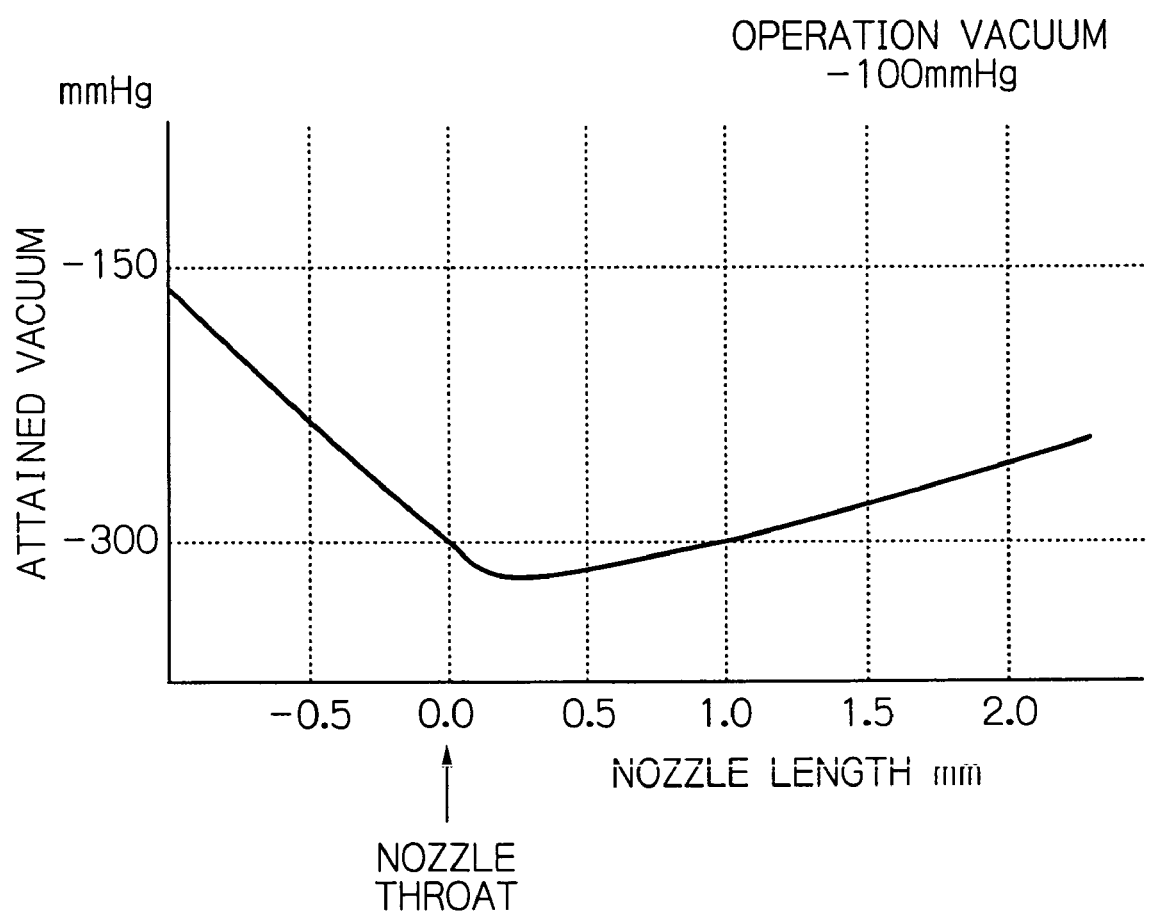
FIG. 9 is a graph showing a relationship between an attained vacuum and a nozzle length.

The inventor has also assured that the distance between the throat 90 and the nozzle outlet end 92 (the distance being hereinafter referred to as "nozzle length") also influences the attained vacuum. FIG. 9 represents a test result showing the relationship between the nozzle length and the attained vacuum. As shown in this figure, rather than making the nozzle throat a termination of the nozzle, it is desirable that the nozzle has an extension from the throat which has a length less than 1.0 mm.

Figure 10:
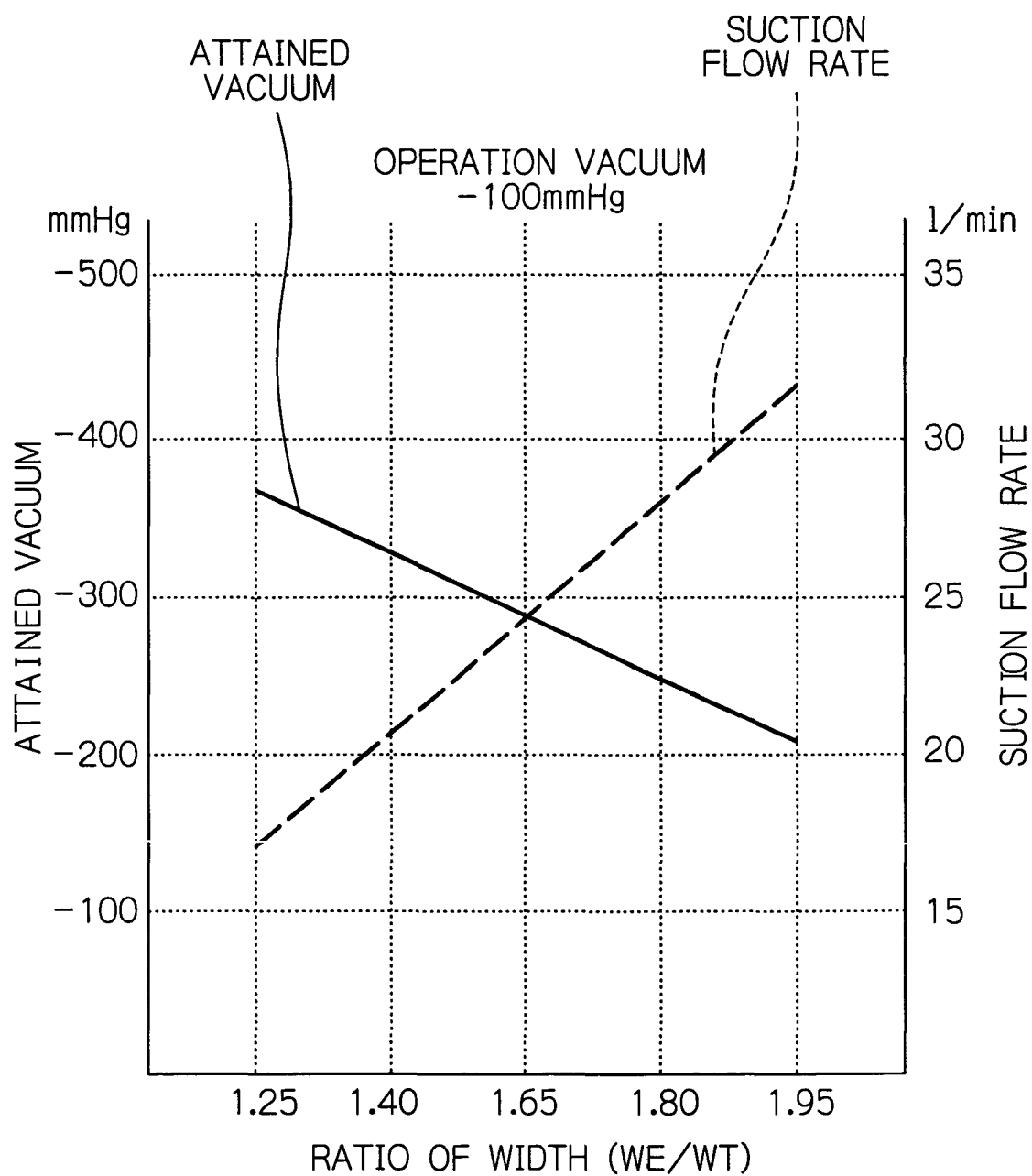
FIG. 10 is a graph showing a relationship which an attained vacuum and a suction flow rate have with respect to the change in a ratio of the width of a throat of a nozzle and the width of the inlet portion of a diffuser.

As previously explained, the diffuser 62 is widened to have the width (WE) at the inlet end. This arrangement is advantageous since the greater the width (WE) is, the more the flow rate sucked through the suction ports 66 becomes. On the other hand, if the width (WE) is increased, the walls becomes farther from a main stream of the air discharged from the nozzle and, therefore, the attained vacuum is lowered. FIG. 10 represents a test result showing variations in the attained vacuum and the flow rate of the air sucked through the suction ports 66 when the ratio of the width of the diffuser inlet end to the width of the throat (WE/WT) is varied. It will be appreciated that in the range of the ratio of 1.4–1.8, each one of the attained vacuum and the flow rate takes a reasonably high value and not deteriorates the other factor undesirably.

What is claimed is:

1. An ejector comprising an ejector body having therein integrally formed a nozzle having inlet and outlet ends, a diffuser having inlet and outlet ends and a suction passage defining a suction port between the outlet end of said nozzle and the inlet end of said diffuser, said nozzle and diffuser defining fluid passages of a rectangular cross section having a constant height in which the narrowest portion of the fluid passage of the nozzle defines a throat, wherein, opposing side walls of said fluid passage of the diffuser have diverging portions each of which resides in a zone of angle of 2.5–5 degrees with respect to a line drawn in parallel with the centerline of the diffuser from the point of the associated one of opposing side walls of said fluid passage of the nozzle at said throat, and wherein the cross sectional area of said throat is within a range of 1.5–4.0 mm$^2$.

2. An ejector according to claim 1, wherein said diverging portions are symmetrically arranged with respect to the centerline of the diffuser so that they define therebetween an angle in a range of 5–10 degrees.

3. An ejector according to claim 2, wherein said diverging portions define 7.5 degrees therebetween.

4. An ejector according to claim 1, wherein said throat defines an elongated rectangular cross section having a major axis in its height direction and a minor axis in its widthwise direction.

5. An ejector according to claim 4, wherein the ratio between the dimensions of said rectangular cross section of said throat, taken along said major and minor axes, is within a range of 2–4.

6. An ejector according to claim 1, wherein said nozzle is extended from said throat so that said outlet end has a distance from the throat less than 1.0 mm.

7. An ejector comprising an ejector body having therein integrally formed a nozzle having inlet and outlet ends, a diffuser having inlet and outlet ends and a suction passage defining a suction port between the outlet end of said nozzle and the inlet end of said diffuser, said nozzle and diffuser defining fluid passages of a rectangular cross section having a constant height in which the narrowest portion of the fluid passage of the nozzle defines a throat, wherein, opposing side walls of said fluid passage of the diffuser have diverging portions each of which resides in a zone of angle of 2.5–5 degrees with respect to a line drawn in parallel with the centerline of the diffuser from the point of the associated one of opposing side walls of said fluid passage of the nozzle at said throat, wherein said fluid passage of the diffuser is enlarged in an end portion adjacent to said inlet end to have a constant cross sectional area, and wherein the ratio of the width of said enlarged end portion of the diffuser to the width of said throat is within a range of 1.4–1.8.

8. An ejector according to claim 7, wherein said diverging portions are symmetrically arranged with respect to the centerline of the diffuser so that they define therebetween an angle in a range of 5–10 degrees.

9. An ejector according to claim 8, wherein said diverging portions define 7.5 degrees therebetween.

10. An ejector according to claim 7, wherein said throat defines an elongated rectangular cross section having a major axis in its height direction and a minor axis in its widthwise direction.

11. An ejector according to claim 10, wherein the ratio between the dimensions of said rectangular cross section of said throat, taken along said major and minor axes, is within a range of 2–4.

12. An ejector according to claim 7, wherein said nozzle is extended from said throat so that said outlet end has a distance from the throat less than 1.0 mm.

13. An ejector comprising an ejector body having therein integrally formed a nozzle having inlet and outlet ends, a diffuser having inlet and outlet ends and a suction passage defining a suction port between the outlet end of said nozzle and the inlet end of said diffuser, said nozzle and diffuser defining fluid passages of a circular cross section in which the narrowest portion of the fluid passage of the nozzle defines a throat, wherein, the wall of said fluid passage of the diffuser has diverging portion which diverges in such a way that a generator resides in a zone of angle of 1.75–3.25 degrees with respect to a line drawn in parallel with the centerline of the diffuser from the point on the wall of said fluid passage of the nozzle at the throat, and wherein the cross sectional area of said throat is within a range of 1.5–4.0 mm$^2$.

14. An ejector according to claim 13, wherein said diverging portion is symmetrical with respect to the centerline of the diffuser so that it defines an angle in a range of 3.5–6.5 degrees.

15. An ejector according to claim 14, wherein said diverging portion defines 5.0 degrees.

16. An ejector according to claim 13, wherein said nozzle is extended from said throat so that said outlet end has a distance from the throat less than 1.0 mm.

17. An ejector according to claim 13, wherein said fluid passage of the diffuser is enlarged in an end portion adjacent to said inlet end to have a constant cross sectional area.

* * * * *